US006539640B1

(12) United States Patent
Brown

(10) Patent No.: US 6,539,640 B1
(45) Date of Patent: Apr. 1, 2003

(54) PLUMB BOB SYSTEM

(76) Inventor: Raymond L. Brown, 22 Los Maestros Ave., Mayaguez, PR (US) 00680

( * ) Notice: Subject to any disclaimer, the term of this patent is extended or adjusted under 35 U.S.C. 154(b) by 0 days.

(21) Appl. No.: 09/702,192

(22) Filed: Oct. 30, 2000

(51) Int. Cl.[7] .............................................. G01C 15/10
(52) U.S. Cl. .............................. 33/393; 33/392; 33/365
(58) Field of Search .......................... 33/393, 391, 392, 33/394, 365, 370, 371

(56) References Cited

U.S. PATENT DOCUMENTS

| | | |
|---|---|---|
| 746,554 A | 12/1903 | Moran et al. |
| 977,735 A | 12/1910 | Hansen, Jr. |
| 1,003,499 A | 9/1911 | Platt |
| 1,308,699 A | 7/1919 | Cusick |
| 1,874,057 A | 8/1932 | Murphy |
| 2,384,914 A * | 9/1945 | Hoagland ................... 33/393 |
| 2,583,491 A * | 1/1952 | Orlando ..................... 33/348 |
| 2,729,897 A | 1/1956 | Smith |
| 3,011,263 A * | 12/1961 | Unger ........................ 33/393 |
| 3,016,616 A | 1/1962 | Matson |
| 3,254,418 A | 6/1966 | Steckle |
| 3,879,852 A | 4/1975 | Bondi |
| 4,202,108 A | 5/1980 | Adams, Jr. et al. |
| 4,970,797 A | 11/1990 | Sarasin |
| 5,001,839 A | 3/1991 | Jones |
| 5,201,129 A | 4/1993 | Ukawa |
| 5,481,809 A | 1/1996 | Rooney |

FOREIGN PATENT DOCUMENTS

GB  2194048  * 2/1988 .................. 33/392

* cited by examiner

*Primary Examiner*—Diego Gutierrez
*Assistant Examiner*—Madeline Gonzalez
(74) *Attorney, Agent, or Firm*—Michael S. Neustel

(57) ABSTRACT

A plumb bob system for allowing an individual to easily utilize a plumb bob in determining whether a wall is plumb. The plumb bob system includes a pole, an engaging structure attached to an upper end of the pole, a pulley rotatably positioned within the engaging structure, a spool containing a length of string passing about the pulley, and a plumb bob attached to the end of the string opposite of the spool. The engaging structure is comprised of a first member and a second member having a first edge and a second edge respectively. The first edge and second edge have a common length of radius from a center point of the pulley to provide an average upper distance (Z) of the string from the wall. The center of the plumb bob has a distance from the lower portion of the wall (X) that is compared to the upper distance (Z). If the upper distance (Z) and the lower distance (X) are equal then the wall is being constructed plumb and no modifications are required in the construction of the wall. If the upper distance (Z) and the lower distance (X) are different then the builders will have to adjust the building of the wall accordingly to avoid building the wall in a non-vertical fashion.

16 Claims, 6 Drawing Sheets

PLUMB BOB SYSTEM

BACKGROUND OF THE INVENTION

1. Field of the Invention

The present invention relates generally to plumb bob devices and more specifically it relates to a plumb bob system for allowing an individual to easily utilize a plumb bob in determining whether a wall is plumb.

2. Description of the Prior Art

Plumb bob devices have been in use for years. Typically, plumb bob devices are comprised of a weight member having a pointed lower end and a length of string attached to the upper end. To utilize a conventional plumb bob device a first person must climb a ladder or scaffolding to lower the plumb bob a first distance (Z) from the upper portion of the wall while a second person measures a second distance (X) from the lower portion of the wall.

The main problem with conventional plumb bob devices is that they are extremely labor intensive and require two individuals to measure a wall. In addition, a conventional plumb bob requires a first person to be elevated via a structure such as a ladder or scaffolding. Also, since measuring whether a wall is plumb or not is time consuming many individuals constructing a wall take fewer measurements than desired to ensure that the wall is being constructed plumb.

Examples of patented plumb bob devices which are illustrative of such prior art include U.S. Pat. No. 4,970,797 to Sarasin; U.S. Pat. No. 1,003,499 to Platt; U.S. Pat. No. 3,254,418 to Steckle; U.S. Pat. No. 977,735 to Hansen, Jr.; U.S. Pat. No. 5,481,809 to Rooney; U.S. Pat. No. 5,201,129 to Ukawa; U.S. Pat. No. 5,001,839 to Jones; U.S. Pat. No. 4,202,108 to Adams, Jr. et al.; U.S. Pat. No. 3,879,852 to Bondi; U.S. Pat. No. 3,016,616 to Matson; U.S. Pat. No. 2,729,897 to Smith; U.S. Pat. No. 1,874,057 to Murphy; U.S. Pat. No. 1,308,699 to Cusick; U.S. Pat. No. 746,554 to Moran et al.

While these devices may be suitable for the particular purpose to which they address, they are not as suitable for allowing an individual to easily utilize a plumb bob in determining whether a wall is plumb. Conventional plumb bob devices require two people to accurately measure whether a wall is plumb or not. In addition, conventional plumb bob devices are labor intensive thereby costing a business money in measuring whether a wall is plumb.

In these respects, the plumb bob system according to the present invention substantially departs from the conventional concepts and designs of the prior art, and in so doing provides an apparatus primarily developed for the purpose of allowing an individual to easily utilize a plumb bob in determining whether a wall is plumb.

SUMMARY OF THE INVENTION

In view of the foregoing disadvantages inherent in the known types of plumb bob devices now present in the prior art, the present invention provides a new plumb bob system construction wherein the same can be utilized for allowing an individual to easily utilize a plumb bob in determining whether a wall is plumb.

The general purpose of the present invention, which will be described subsequently in greater detail, is to provide a new plumb bob system that has many of the advantages of the plumb bob devices mentioned heretofore and many novel features that result in a new plumb bob system which is not anticipated, rendered obvious, suggested, or even implied by any of the prior art plumb bob devices, either alone or in any combination thereof.

To attain this, the present invention generally comprises a pole, an engaging structure attached to an upper end of the pole, a pulley rotatably positioned within the engaging structure, a spool containing a length of string passing about the pulley, and a plumb bob attached to the end of the string opposite of the spool. The engaging structure is comprised of a first member and a second member having a first edge and a second edge respectively. The first edge and second edge have a common length of radius from a center point of the pulley to provide an average upper distance (Z) of the string from the wall. The center of the plumb bob has a distance from the lower portion of the wall (X) that is compared to the upper distance (Z). If the upper distance (Z) and the lower distance (X) are equal then the wall is being constructed plumb and no modifications are required in the construction of the wall. If the upper distance (Z) and the lower distance (X) are different then the builders will have to adjust the building of the wall accordingly to avoid building the wall in a non-vertical fashion.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a plumb bob system that will overcome the shortcomings of the prior art devices.

A second object is to provide a plumb bob system for allowing an individual to easily utilize a plumb bob in determining whether a wall is plumb.

Another object is to provide a plumb bob system that does not require two or more people to measure whether a wall is plumb or not.

An additional object is to provide a plumb bob system that does not require an individual to be elevated to retain the upper portion of a string attached to a plumb bob.

A further object is to provide a plumb bob system that accurately measures whether a wall is plumb.

Another object is to provide a plumb bob system that can be easily utilized by one individual.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
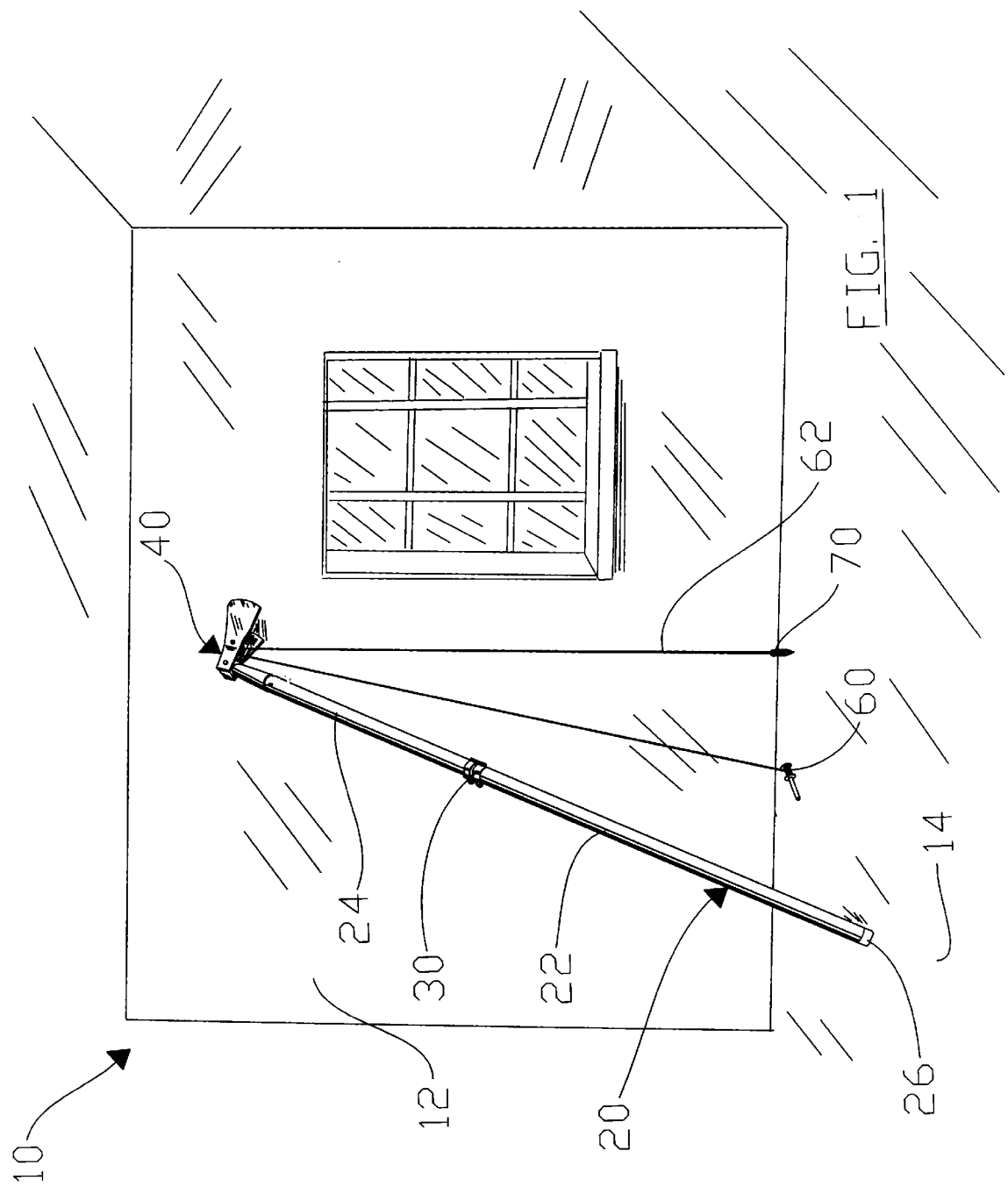
FIG. 1 is an upper perspective view of the present invention positioned adjacent a wall of a building structure.

Turning now descriptively to the drawings, in which similar reference characters denote similar elements throughout the several views, FIGS. 1 through 6 illustrate a plumb bob system 10, which comprises a pole 20, an engaging structure 40 attached to an upper end of the pole 20, a pulley 50 rotatably positioned within the engaging structure 40, a spool 60 containing a length of string 62 passing about the pulley 50, and a plumb bob 70 attached to the end of the string 62 opposite of the spool 60. The engaging structure 40 is comprised of a first member 42 and a second member 44 having a first edge 46 and a second edge 48 respectively. The first edge 46 and second edge 48 have a common length of radius from a center point of the pulley 50 to provide an average upper distance (Z) of the string 62 from the wall 12. The center of the plumb bob 70 has a distance from the lower portion of the wall 12 (X) that is compared to the upper distance (Z). If the upper distance (Z) and the lower distance (X) are equal then the wall 12 is being constructed plumb and no modifications are required in the construction of the wall 12. If the upper distance (Z) and the lower distance (X) are different then the builders will have to adjust the building of the wall 12 accordingly to avoid building the wall 12 in a non-vertical fashion.

Figure 2:
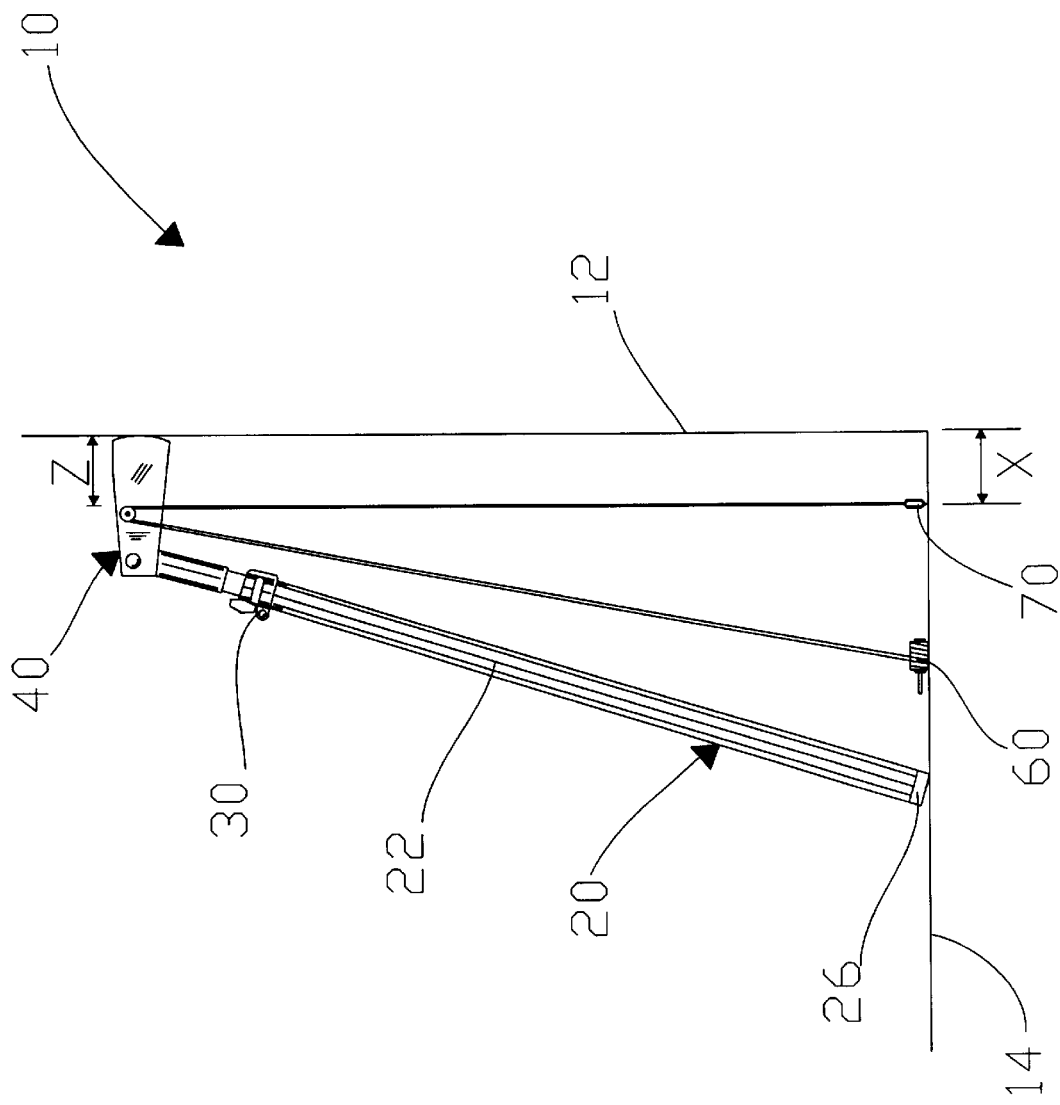
FIG. 2 is a side view of the present invention positioned adjacent the wall of a building structure.
Figure 3:
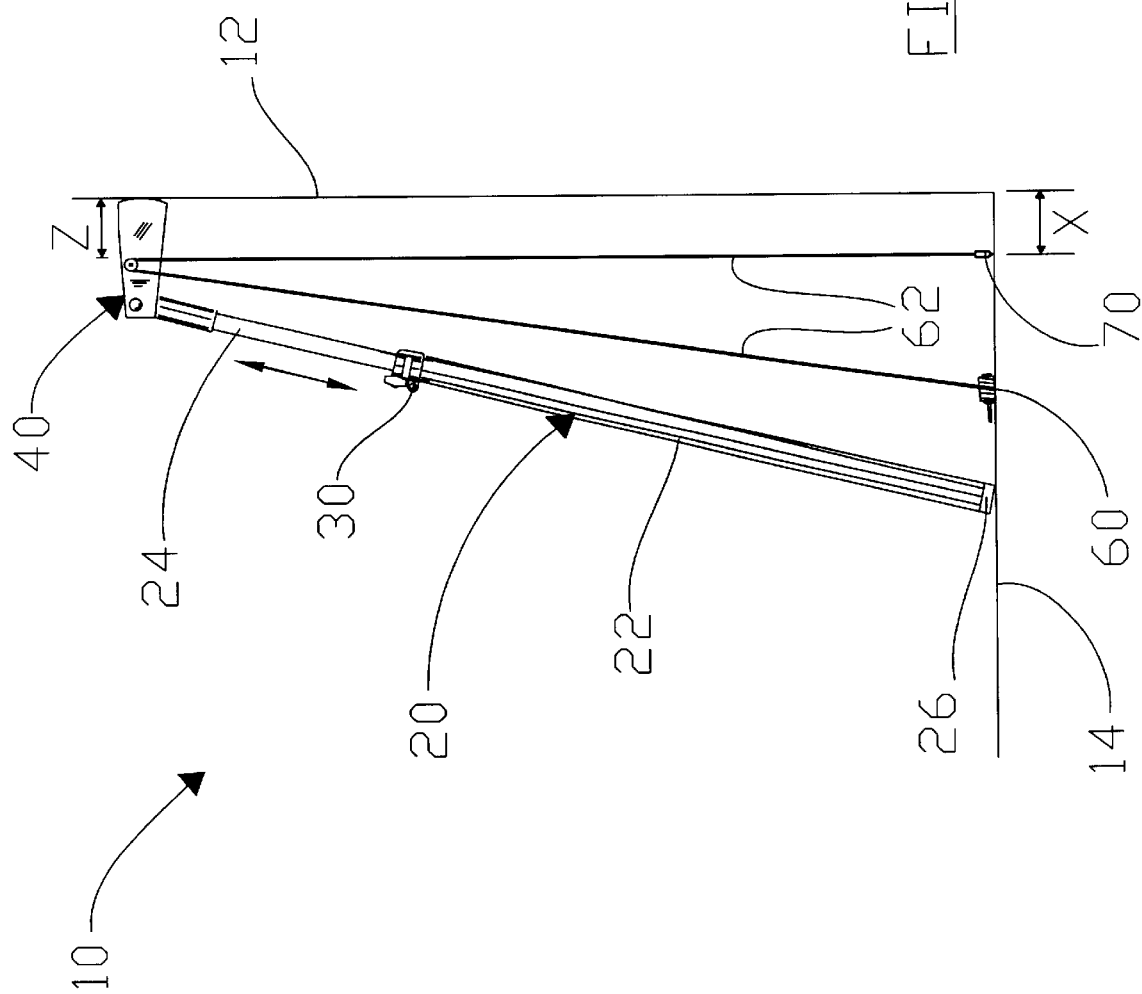
FIG. 3 is a side view of the present invention in an extended position positioned adjacent the wall of a building structure.

As shown in FIGS. 1 through 3 of the drawings, the pole 20 is comprised of an elongate structure having a lower end and an upper end. The lower end of the pole 20 preferably includes an end member 26 constructed of a gripping material such as rubber or the like to prevent slippage of the pole 20 when positioned upon the ground 14 or other surface.

The pole 20 preferably is constructed of a telescoping structure for allowing adjustment of the height thereby allowing the measurement of walls 12 having various heights as shown in FIGS. 2 and 3 of the drawings. The telescoping pole 20 is comprised of at least one outer tube 22 and at least one inner tube 24 as shown in FIGS. 2 and 3 of the drawings. The inner tube 24 is slidably positioned within the outer tube 22 to allow adjustment of the relative positions thereby allowing the user to adjust the overall length of the pole 20. A clamp 30 is attached to the upper end of the outer tube 22 to allow tightening about the inner tube 24 when the desired length is achieved thereby preventing the inner tube 24 from accidentally being repositioned with respect to the outer tube 22.

As shown in FIGS. 1 through 6 of the drawings, an engaging structure 40 is attached to the upper end of the pole 20. The engaging structure 40 is preferably pivotally attached to allow adjustment of the engaging structure 40, however the engaging structure 40 may be non-movably attached to the upper end of the pole 20 as can be appreciated. The engaging structure 40 supports the upper end of the pole 20 a finite distance away from the upper portion of the wall 12 being measured.

Figure 4:
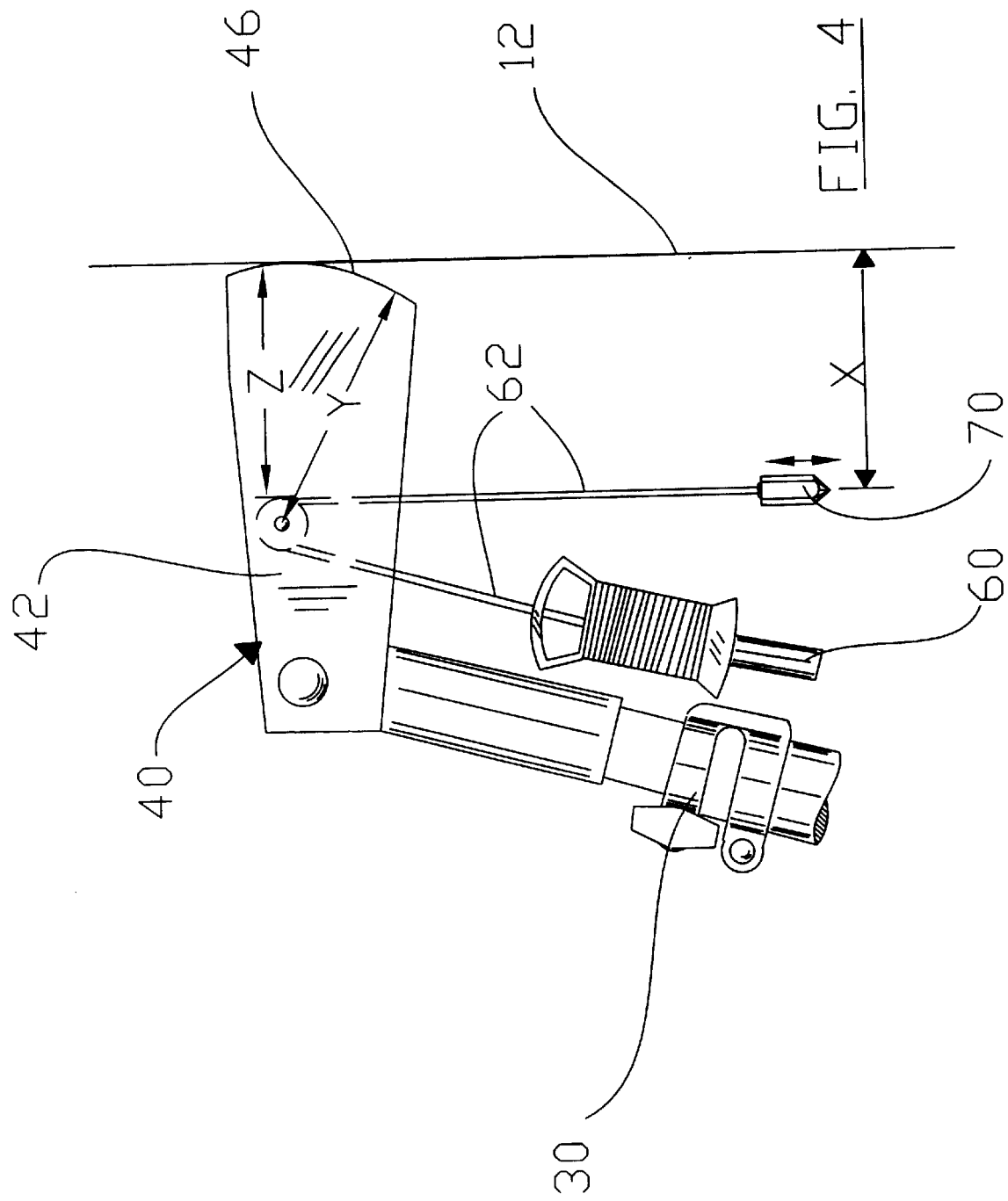
FIG. 4 is a magnified a side view of the engaging structure positioned adjacent the wall of a building structure.
Figure 5:
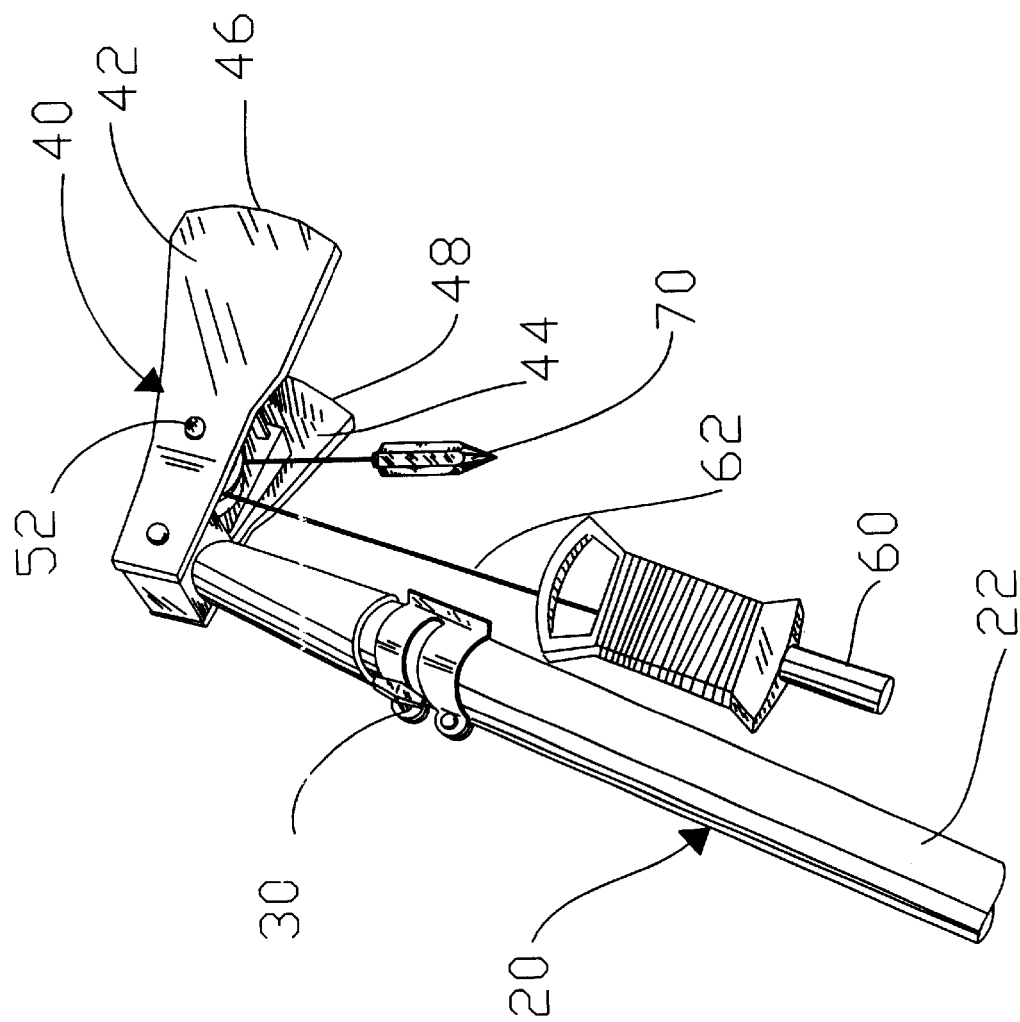
FIG. 5 is a magnified upper rear perspective view of the present invention.
Figure 6:
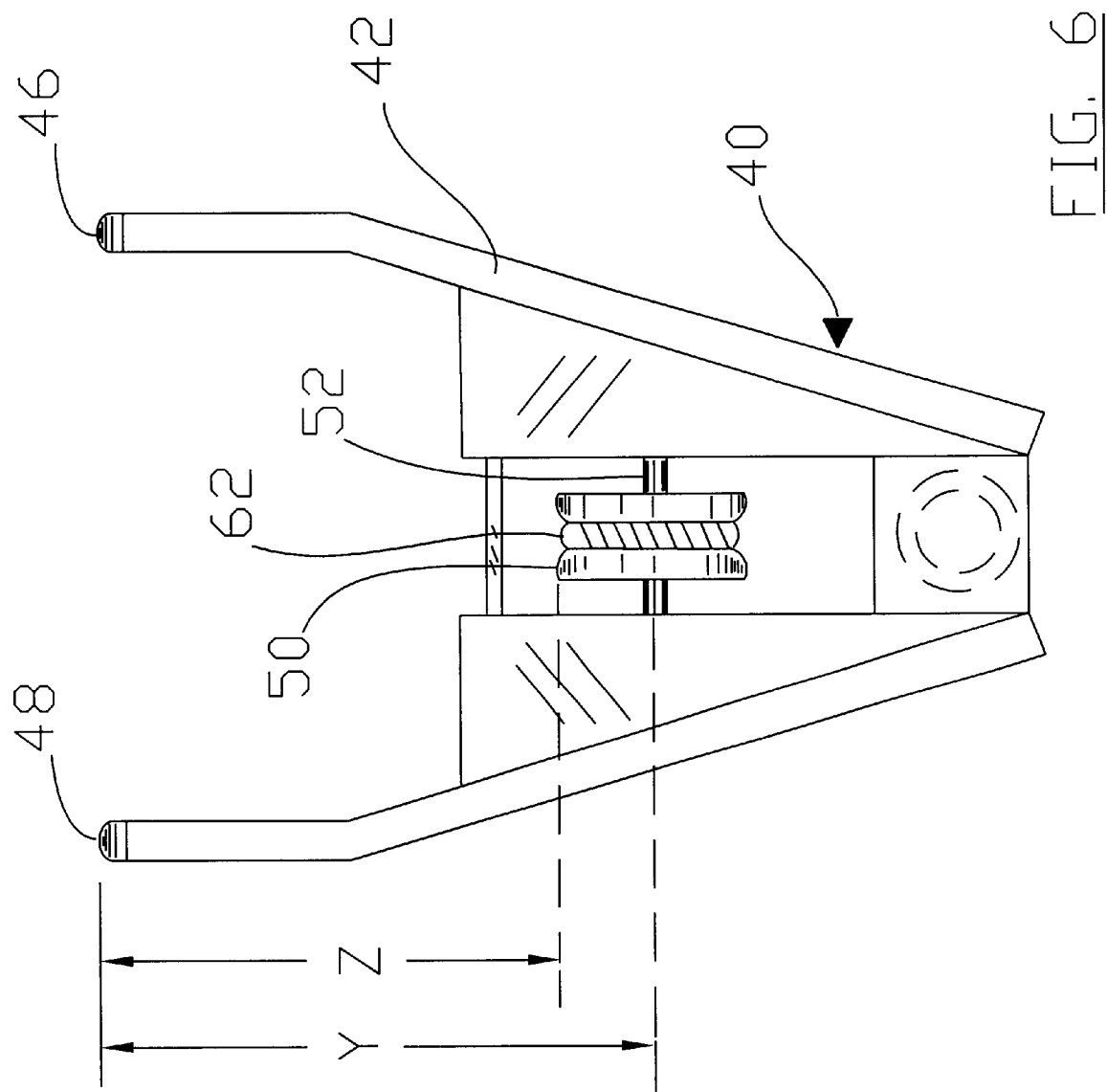
FIG. 6 is a top view of the engaging structure.

As shown in FIG. 6 of the drawings, the engaging structure 40 preferably includes a first member 42 and a second member 44 having a first edge 46 and a second edge 48 respectively. The first edge 46 and the second edge 48 have a common radius of curvature (Y) with respect to a center rotational axis of the pulley 50 as best shown in FIGS. 4 and 6 of the drawings. The first edge 46 and the second edge 48 allow for an average measurement of the upper portion of the wall 12 in places where the wall 12 may have an irregular shaped surface.

As shown in FIGS. 4 and 6 of the drawings, the pulley 50 is rotatably attached within the engaging structure 40 with an axle 52 or similar structure. The length of string 62 attached to the spool 60 extends about the pulley 50 as best shown in FIG. 4 of the drawings. The plumb bob 70 is attached to the end of the string 62 opposite of the spool 60 as further shown in FIG. 4 of the drawings. The pulley 50 has an outer radius and is concentric with a full circle defined by a completed shape of the first edge 46 and the second edge 48. The string 62 has a longitudinal axis that defines a distance (Z) from the wall 12 as further shown in FIG. 4 of the drawings.

In use, the user adjusts the length of the pole 20 to the desired length thereby allowing the pole 20 to be utilized upon various heights of walls 12. The distance (Z) is pre-measured thereby allowing the user to know the distance (X) desired to have a plumb wall 12. The user then positions the first edge 46 and the second edge 48 of the engaging structure 40 adjacent the upper portion of the wall 12 as shown in FIGS. 1 through 3 of the drawings. The pole 20 is preferably at a slight incline leaning toward the wall 12 to provide stability and to ensure that the engaging structure 40 is sufficiently engaging the wall 12 as shown in FIGS. 1 through 3 of the drawings. The user then allows the string 62 upon the spool 60 to be released thereby allowing the plumb bob 70 to be lowered toward the ground 14. When the lower tip of the plumb bob 70 engages the surface of the ground 14 or other surface adjacent the wall 12, the user then measures the distance (X) from the tip of the plumb bob 70 to the lower portion of the wall 12. The user then compares the recently measured distance (X) with respect to the known distance (Z) thereby allowing them to determine whether the wall 12 is plumb. If the upper distance (Z) and the lower distance (X) are equal then the wall 12 is being constructed plumb and no modifications are required in the construction of the wall 12. If the upper distance (Z) and the lower distance (X) are different then the builders will have to adjust the building of the wall 12 accordingly to avoid building the wall 12 in a non-vertical fashion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plumb bob system, comprising:

a pole having a lower end and an upper end;

an engaging structure attached to said upper end of said pole having an outer edge having an elongate structure and a radius (Y), wherein said outer edge is engageable to a wall and non-movable and wherein said radius (Y) of said outer edge has a center point common with a rotational axis of a pulley;

said pulley rotatably positioned within said engaging structure between said pole and said outer edge, wherein a center of said pulley is at least two inches from said upper end of said pole and at least two inches from said outer edge of said engaging structure; and a plumb bob attached to a length of string, wherein said length of string is positioned about said pulley having a vertical longitudinal axis a distance (Z) away from an upper portion of said wall.

2. The plumb bob system of claim 1, wherein said engaging structure is comprised of a first member and a second member having a first edge and a second edge respectively wherein said outer edge is comprised of said first edge and said second edge, wherein said first edge and said second edge have a common radius (Y).

3. The plumb bob system of claim 2, wherein said first member and said second member are spaced apart a finite distance.

4. The plumb bob system of claim 1, wherein said pole is telescoping.

5. The plumb bob system of claim 4, wherein said pole is comprised of an outer tube and an inner tube slidably positioned within said outer tube.

6. The plumb bob system of claim 5, including a clamp mechanism attached to said outer tube and said inner tube for securing said inner tube within a desired position.

7. The plumb bob system of claim 1, including a spool attached to said string opposite of said plumb bob.

8. The plumb bob system of claim 1, wherein said lower end of said pole includes an end member.

9. A method of using a plumb bob system, comprising the steps of:

(a) providing a pole having a lower end and an upper end having an engaging structure attached to said upper end of said pole, wherein said engaging structure has a pulley rotatably positioned within said engaging structure and at least one outer edge having a radius (Y) for engaging an upper portion of a wall wherein said radius (Y) of said outer edge has a center point common with a rotational axis of said pulley, and wherein said length of string is positioned about said pulley having a vertical longitudinal axis a distance (Z) away from said upper portion of said wall;

(b) positioning said lower end upon a surface;

(c) positioning said at least one outer edge adjacent said upper portion of said wall so that said pole is inclined toward said wall;

(d) releasing a length of string positioned about said pulley so that a plumb bob attached thereto is lowered from said pulley toward said surface;

(e) measuring a distance (X) from a lower portion of said wall to said plumb bob; and (f) comparing said distance (X) to said distance (Z).

10. A plumb bob system, comprising:

a pole having a lower end and an upper end;

an engaging structure having a first end and an outer edge having a radius (Y), wherein said first end of said engaging structure is attached to said upper end of said pole, and wherein said outer edge is engageable to a wall and non-movable and wherein said radius (Y) of said outer edge has a center point common with a rotational axis of a pulley;

said pulley rotatably positioned within said engaging structure between said first end and said outer edge, wherein a center of said pulley is at least two inches from said first end and at least two inches from said outer edge of said engaging structure; and a plumb bob attached to a length of string, wherein said length of string is positioned about said pulley having a vertical longitudinal axis a distance (Z) away from an upper portion of said wall.

11. The plumb bob system of claim 10, wherein said engaging structure is comprised of a first member and a second member having a first edge and a second edge respectively wherein said outer edge is comprised of said first edge and said second edge, wherein said first edge and said second edge have a common radius (Y).

12. The plumb bob system of claim 11, wherein said first member and said second member are spaced apart a finite distance.

13. The plumb bob system of claim 10, wherein said pole is telescoping.

14. The plumb bob system of claim 13, wherein said pole is comprised of an outer tube and an inner tube slidably positioned within said outer tube.

15. The plumb bob system of claim 14, including a clamp mechanism attached to said outer tube and said inner tube for securing said inner tube within a desired position.

16. The plumb bob system of claim 10, including a spool attached to said string opposite of said plumb bob.

* * * * *